United States Patent [19]

Steuer

[11] 4,344,761
[45] Aug. 17, 1982

[54] SIDE-BAR CHAIN FOR CONE PULLEY TRANSMISSIONS

[75] Inventor: Herbert K. Steuer, Bad Homburg, Fed. Rep. of Germany

[73] Assignee: P.I.V. Antrieb Werner Reimers GmbH & Co. KG, Bad Homburg, Fed. Rep. of Germany

[21] Appl. No.: 90,587

[22] Filed: Nov. 2, 1979

[30] Foreign Application Priority Data

Nov. 7, 1978 [DE] Fed. Rep. of Germany ....... 2848167

[51] Int. Cl.³ .............................................. F16G 5/18
[52] U.S. Cl. .................... 474/245; 474/229; 474/903
[58] Field of Search ............... 474/201, 205, 206, 240, 474/244, 245, 212–219, 153, 167, 155–157, 202, 207, 210, 237, 238, 241, 242, 246, 247, 273; 198/851; 74/437, 443, 462; 59/85

[56] References Cited

U.S. PATENT DOCUMENTS

| 601,525 | 3/1898 | Pastor | 474/206 |
|---|---|---|---|
| 2,941,413 | 6/1960 | Huber et al. | 474/205 |
| 3,089,346 | 5/1963 | Ditirich et al. | 474/242 |
| 3,241,392 | 3/1966 | Hardy | 74/462 |
| 3,319,777 | 5/1967 | Dommann | 474/206 X |
| 3,329,037 | 7/1967 | Stott | 74/443 |
| 3,353,421 | 11/1967 | Ketterle et al. | 474/215 |
| 3,364,767 | 1/1968 | Bredschneider et al. | 474/245 |
| 3,377,875 | 4/1968 | Sand | 74/443 |
| 3,916,709 | 11/1975 | Steuer et al. | 474/242 |
| 4,264,314 | 4/1981 | Imamura | 474/205 |

FOREIGN PATENT DOCUMENTS 1979429 2/1968 Fed. Rep. of Germany.

Primary Examiner—C. J. Husar
Assistant Examiner—Conrad Berman
Attorney, Agent, or Firm—Spencer & Kaye

[57] ABSTRACT

In a side-bar chain for an infinitely variable cone pulley transmission, which chain is composed of packs of side bars forming successive links which are articulatedly connected with one another, and thrust pieces acting transversely of the longitudinal direction of the chain for friction force transmission between cone pulleys and the side-bar chain, the lengths of selected ones of the links, between associated articulations, are made different from those of the remainder of the links of the chain.

4 Claims, 2 Drawing Figures

SIDE-BAR CHAIN FOR CONE PULLEY TRANSMISSIONS

BACKGROUND OF THE INVENTION

The present invention relates to a side-bar chain for infinitely variable cone pulley transmissions of the type composed of packs of side bars forming the chains links articulatedly connected with one another and thrust pieces acting transversely of the longitudinal direction of the chain for the transmission of friction force between cone pulleys and side-bar chain.

Such side-bar chains are known in many forms. Thus, as disclosed for example in U.S. Pat. No. 3,089,346, they can be composed of thrust pieces for friction force transmission between the articulation points formed by rocker piece pairs, which thrust pieces extend transversely through the pack of side bars, and clamp straps which laterally hold these thrust pieces together, transversely of the longitudinal direction of the chain, in an aperture formed for this purpose, in order to come into frictional contact via their ends with the cone pulleys.

In other known chains as disclosed, for example, in U.S. Pat. No. 3,364,767 where the packs of side bars forming the chain links are articulatedly connected with one another by joint bolts and then between the respective joint bolts for example T-shaped thrust pieces serving for friction force transmission are pushed into the packs of side bars.

More recently proposed side-bar chains, such as those disclosed in U.S. Pat. Nos. 3,353,421 and 3,916,709 make use of pairs of rocker pieces forming the joint at the same time as thrust pieces, which also come into frictionally engaging contact with the cone pulleys, for power transmission.

Another form of construction is described in Federal Republic of Germany Gebrauchsmuster (Utility Model) No. 1,979,429. Here again there are packs of side bars which form each chain link and are connected with one another by joint bolts. Between the joints the side-bar packs are surrounded by thrust rings which are rotatable about the side-bar pack about an axis parallel with the longitudinal direction of the chain, and come into frictional contact with the cone pulleys.

The above-mentioned examples of the prior art show that fundamentally with the initially stated classification all side-bar chains for cone pulley transmissions are to be covered, irrespective of the details of their construction.

One burdensome phenomenon in cone pulley transmissions where the force transmission takes place through individual thrust pieces of a chain is the noise which is generated. Its occurence is mainly attributable to the fact that impacts occur between the thrust pieces and the cone pulleys when the chain enters the V-gap of a pair of cone pulleys. On account of their high quality, the cone pulleys are predominantly bodies of good resonance which correspondingly promote the generation of noise. These noises become especially burdensome if the frequency of the entry impacts of the chain stimulates the cone pulleys into sympathetic, or resonant vibrations.

Apart from the burden of noise, a further trouble consists in that the irregular movements caused by sympathetic vibrations are transmitted further from the transmission and, for example in a production process, can impart corresponding irregularities to a workpiece being machined or the like.

SUMMARY OF THE INVENTION

It is an object of the present invention to prevent the occurence, in a side-bar chain of the initially described kind, of sympathetic vibrations between the chain on the one part and the cone pulleys on the other. Other objects of the invention are to provide a side-bar chain which can be manufactured economically, and whose overall form and manner of operation are unaffected.

In accordance with the invention, these objects are achieved by causing the lengths of selected links between associated articulation points to differ from those of the remaining links. This measure according to the invention has the effect that a tendency for a sympathetic vibration to build up receives interference from a link of different length and thus is damped or interrupted, without this step being detrimental to the power transmission capacity between the chain and cone pulleys and without the necessity of effecting a fundamental modification in the chain assembly. For the links of different length, it is only necessary to alter the lengths of the component side-bars, produced mostly by stamping, so that only one, or at most two, components of this kind must be available, depending on the nature of the chain.

It has proved expedient to combine links of two different lengths with one another, which has been found to be entirely sufficient to achieve the goals of the invention. Fundamentally, it would naturally be possible to keep several different chain link lengths available, which however would merely unnecessarily increase the requirement for parts to be produced differently and for their stock-keeping.

Furthermore, it has proved especially advantageous for the links to be combined irregularly with one another. It would, in fact, be possible to arrange the links of different lengths in alternation, one after the other, in a regular sequence. In individual cases, however, this would again bring the danger of sympathetic vibrations superimposed on one another. Therefore an irregular series arrangement of links of different lengths in accordance with the invention is especially preferable.

Finally, in a side-bar chain where each second link includes a U-shaped clamp strap, which holds the side-bar packs together laterally, it is especially expedient for the links with clamp strap to all be similar to one another and for at least some of the links arranged between these to have a length differing therefrom. In this way the links having the greater number of parts are always the same, so that the different length is provided only on the links having the minimum number of parts. Thus, the number of parts of the links differing in length from most of the chains links is kept especially low, in the most favorable case to the extent of a side bar with modified length between the two joints bores.

DESCRIPTION OF THE PREFERRED EMBODIMENTS

Figure 1:
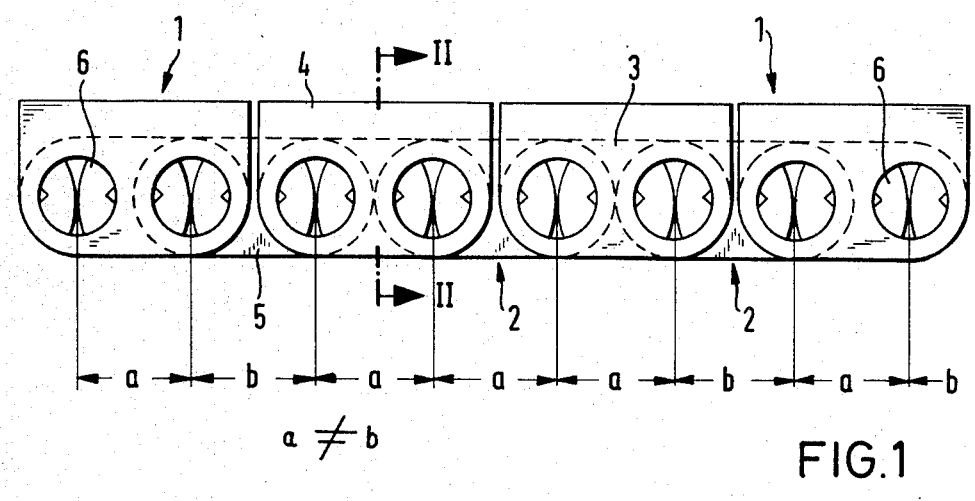
FIG. 1 is a side elevational view of a preferred embodiment of a side-bar chain according to the invention.
Figure 2:
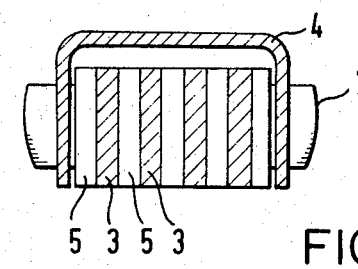
FIG. 2 is a cross-sectional view along the line II—II of FIG. 1.

FIGS. 1 and 2 show a side-bar chain having links 1 and links 2 interconnected together. The links 1 are composed of side bars 3 and clamp straps 4 bent into a U-shape, while the links 2 are composed of side bars 5. The individual links 1 and 2 are articulatedly connected with one another at their articulation points by rocker piece pairs 6, one piece of each pair is in shape-locking engagement against rotation with the bars of a respective adjacent link and roll on one another with their rocker surfaces directed towards one another. More specifically, the bars 5 of one link are in such engagement with one piece and the bars 3 of the link adjacent thereto are in engagement with the other piece of a particular pair. The operation of such chain joints formed by rocker pieces is known and is disclosed, for example, in U.S. Pat. No. 3,916,709.

The rocker pieces of the rocker piece pairs 6 have end faces 7 with which they come into frictional contact with the cone pulleys of the transmission.

As may be seen especially in FIG. 1, successive intervals a and b between the joints, or pivot planes, formed by the rocker piece pairs 6 are unequal. To this extent, as can also be seen from FIG. 1, the pivot planes associated with each link 1 composed of a clamp strap 4 and side bars 3 are always spaced apart from one another by the same spacing a, while the pivot planes associated with each link 2 composed of side bars 5 can be spaced apart from one another sometimes by the spacing a and sometimes by a spacing b different from the spacing a. The assembling of such a chain takes place, as illustrated in FIG. 1, expediently so that the sequence of the spacings a and b is irregular, so that no sympathetic vibrations can develop due to a regularly recurring irregularity.

The different spacing is expediently affected with respect to the links 2, since these consist essentially only of the side bars 5, so that the links 1, which also have the clamp strap 4, are always the same. In this way, it is not necessary to produce and store clamp straps 4 of different sizes as well.

Beside the example, as illustrated in FIG. 1, naturally many other possibilities of combination also exist in which one or more links 2 with the spacing b or the spacing a follow one another with links 1 interposed between successive links 2. A preferred example of the change of different spacings is given as follows:

aaabaaababaaabaaabababaaababaaabaaabab

The ratio b/a depends on size of transmission and chain speed.

It is to be understood that the above description of the present invention is susceptible to various modifications, changes and adaptations, and the same are intended to be comprehended within the meaning and range of equivalents of the appended claims.

What is claimed is:

1. In a side-bar chain for an infinitely variable cone pulley transmission, which is composed of packs of side bars forming successive links which are articulatedly connected with one another, and thrust pieces acting transversely of the longitudinal direction of the chain for friction force transmission between cone pulleys and the side-bar chain, the improvement wherein the lengths of selected ones of said links, between associated articulations, are different from those of the remainder of said links of said chain for minimizing vibrations between said chain and the associated cone pulleys during operation of the transmission.

2. Side-bar chain according to claim 1 wherein two links of respectively different lengths are connected with one another.

3. Side-bar chain according to claim 2 wherein links of respectively different lengths are irregularly distributed along said chain.

4. Side-bar chain according to claim 1, 2, or 3 where every alternate link along said chain comprises a U-shaped clamp strap holding one said pack of side bars together laterally, said packs of links associated with said clamp straps are of identical length and said selected links are interposed between selected ones of said alternate links.

* * * * *